US006980692B2

(12) United States Patent  (10) Patent No.: US 6,980,692 B2
Chamberlain  (45) Date of Patent: *Dec. 27, 2005

(54) METHOD AND APPARATUS FOR DYNAMIC THRESHOLDING OF GRAYSCALE IMAGES TO DELINEATE IMAGE ATTRIBUTES

(75) Inventor: Lyle Joseph Chamberlain, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 705 days.

This patent is subject to a terminal disclaimer.

(21) Appl. No.: 09/957,866

(22) Filed: Sep. 20, 2001

(65) Prior Publication Data

US 2003/0053691 A1    Mar. 20, 2003

(51) Int. Cl.[7] .............................................. G06K 9/00
(52) U.S. Cl. ...................... 382/170; 382/173; 382/190; 382/141; 382/153; 382/103
(58) Field of Search ................................ 382/170, 173, 382/294, 190, 141, 103, 153; 250/559.37, 250/559.33, 559.2, 559.3, 559.31, 559.29, 250/559.44, 559.46; 700/259, 215; 356/3.07; 235/375, 419, 435

(56) References Cited

U.S. PATENT DOCUMENTS

| | | |
|---|---|---|
| 3,831,197 A | 8/1974 | Beach et al. |
| 4,305,130 A | 12/1981 | Kelley et al. |
| 4,373,804 A | 2/1983 | Pryor et al. |
| 4,481,592 A | 11/1984 | Jacobs et al. |
| 4,539,703 A | 9/1985 | Clearman et al. |
| 4,707,647 A | 11/1987 | Coldren et al. |
| 4,737,845 A | 4/1988 | Susuki et al. |
| 4,738,025 A | 4/1988 | Arnold |
| 4,937,690 A | 6/1990 | Yamashita et al. |
| 4,945,429 A | 7/1990 | Munro et al. |
| 4,979,135 A | 12/1990 | Moy |
| 5,034,904 A * | 7/1991 | Moy ........................... 700/259 |
| 5,164,909 A | 11/1992 | Leonhardt et al. |
| 5,179,599 A * | 1/1993 | Formanek ................... 382/172 |
| 5,219,258 A | 6/1993 | Yeakley |
| 5,280,179 A | 1/1994 | Pryor et al. |
| 5,297,238 A | 3/1994 | Wang et al. |
| 5,323,327 A * | 6/1994 | Carmichael et al. ......... 700/215 |
| 5,384,647 A | 1/1995 | Fukushima |

(Continued)

Primary Examiner—Kanjibhai Patel
Assistant Examiner—Ali Bayat
(74) Attorney, Agent, or Firm—Chambliss, Bahner & Stophel, P.C

(57) ABSTRACT

A method and apparatus for dynamic thresholding of grayscale images to delineate image attributes is disclosed. The system includes a picker assembly, an imager disposed on picker assembly, illumination sources disposed at the picker assembly and a processor, coupled to the imager and illumination sources, for processing image data obtained from the imager and for controlling the illumination sources, wherein the processor applies dynamic image thresholding to the image to select an optimum gray scale level of the image, the image expected to include a desired physical feature. The processor performs dynamic image thresholding by identifying a region of interest around the area where the intersection is expected to be, thresholding the portion of the image within the region of interest with an experimental value, calculating the ratio of black pixels to the total number of pixels, using a search method that is based on a histogram of the ratio across the threshold spectrum to actively search for a threshold value that produces a closest match to the target ratio value and thresholding the entire image with the threshold value producing the closest match to the target value.

12 Claims, 8 Drawing Sheets

U.S. PATENT DOCUMENTS

| | | |
|---|---|---|
| 5,416,914 A | 5/1995 | Korngiebel et al. |
| 5,579,444 A | 11/1996 | Dalziel et al. |
| 5,686,960 A * | 11/1997 | Sussman et al. ......... 348/218.1 |
| 5,693,953 A | 12/1997 | Pryor et al. |
| 5,737,217 A | 4/1998 | Nishikawa et al. |
| 5,767,525 A | 6/1998 | Pryor et al. |
| 5,774,301 A | 6/1998 | Manes et al. |
| 5,786,602 A | 7/1998 | Pryor et al. |
| 5,811,827 A | 9/1998 | Pryor et al. |
| 5,835,684 A | 11/1998 | Bourne et al. |
| 5,878,151 A | 3/1999 | Tang et al. |
| 5,889,926 A | 3/1999 | Bourne et al. |
| 5,909,504 A | 6/1999 | Whitman |
| 2003/0053715 A1 * | 3/2003 | Chamberlain ............... 382/294 |

* cited by examiner

METHOD AND APPARATUS FOR DYNAMIC THRESHOLDING OF GRAYSCALE IMAGES TO DELINEATE IMAGE ATTRIBUTES

BACKGROUND OF THE INVENTION

1. Field of the Invention

This invention relates in general to automated tape library systems, and more particularly to a method and apparatus for dynamic thresholding of grayscale images to delineate image attributes.

2. Description of Related Art

Magnetic tape has long been used as a storage media for audio, video and computer information. Tape cartridges have been used extensively because they provide a convenient way to house and support a length of magnetic tape for engagement by a transducer in a tape drive while protecting the tape upon removal of the cartridge.

Storage libraries provide large capacity secondary storage to modern computing requirements. Such storage libraries typically employ robotic control mechanisms used by a host computer to physically manage tape media cartridges. A plurality of tape cartridges are stored within a storage library. Each tape cartridge is in a particular slot in the storage library. Each slot is identifiable by its physical position in the storage library. Each tape cartridge is typically uniquely identified by a machine readable label. The storage library maintains inventory information to associate a particular tape cartridge with a particular slot in the storage library. Responsive to a host computer request, a robotic mechanism or picker physically retrieves an appropriate tape cartridge from its associated slot in the storage library, moves the tape cartridge to an appropriate read/write device for processing, and inserts the tape cartridge into the device.

The robotic mechanism typically includes a hand or gripper mechanism positioned on a movable arm. To retrieve a tape cartridge, the arm moves to position the gripper near the slot holding the desired tape cartridge. The gripper then extends and grips the tape cartridge and retracts to take the tape cartridge out of the slot. The arm with the hand gripping the tape cartridge moves to the device and the hand then extends and inserts the tape cartridge into the device. Conversely, when the use of the tape cartridge is complete, the robotic mechanism retrieves the tape cartridge from the read/write device, moves the tape cartridge adjacent its associated slot according to the inventory maintained by the storage library, and inserts the tape cartridge into the storage slot of the storage library ready for future use in response to another host computer request.

A problem with prior automated storage libraries designs which contributed to their relatively higher complexity and resultant higher costs relates to the multiplicity and complexity of various sensing mechanisms used to sense several parameters of the operating storage library. Picker registration has proven to be a problem, resulting in occasional dropped cartridges and decreased system performance. Past registration techniques made use of a "flying spot" paradigm, using an LED retroreflective sensor to locate the position of a few fiducial marks and then calculate the theoretical position of every cartridge cell in robot coordinates to initialize its position table. In practice this method has been less than perfect, with some systems suffering jams or drops. Other techniques have used a dedicated vision processor and bulky CCD camera with incandescent lighting. However, the production cost of such a system is high.

In order for certain vision systems to work correctly, they rely on an image that has been thresholded to delineate the image attributes that the system is searching for. A preprocessing technique commonly referred to as binarization or thresholding compares each pixel in a gray-scale image against a threshold, setting the corresponding pixel in a separate thresholded image to a binary 1 if the value exceeds the threshold, and to a binary 0 if below the threshold. This process is also referred to as "static thresholding." Static thresholding is inadequate for the varying lighting situations and camera settings encountered in normal operation of the aforementioned vision system. A dynamic process must be used to find the optimal threshold setting for all situations.

It can be seen that there is a need for a method and apparatus for dynamic thresholding of grayscale images to delineate image attributes.

SUMMARY OF THE INVENTION

To overcome the limitations in the prior art described above, and to overcome other limitations that will become apparent upon reading and understanding the present specification, the present invention discloses a method and apparatus for dynamic thresholding of grayscale images to delineate image attributes.

The present invention solves the above-described problems by actively searching for an ideal threshold value based on the gray scale content of the input image in question. After the best value has been found, the method thresholds the image with that value, providing a constant thresholded image output even if the lighting of the scene changes. It also does well in situations where lighting or camera settings create regions of extreme low contrast, i.e. underexposed and overexposed images, A system in accordance with the principles of the present invention includes a picker assembly, an imager disposed on the front of the picker assembly, illumination sources disposed at the picker assembly and a processor, coupled to the imager and illumination sources, for processing image data obtained from the imager and for controlling the illumination sources, wherein the processor applies dynamic image thresholding to the image to select an optimum gray scale level of the image, the image expected to include a desired physical feature.

Other embodiments of a system in accordance with the principles of the invention may include alternative or optional additional aspects. One such aspect of the present invention is that the processor performs dynamic image thresholding by identifying a region of interest around the area where the intersection is expected to be, thresholding the portion of the image within the region of interest with an experimental gray scale value, calculating the ratio of black pixels to the total number of pixels, using a search method that may be based on a histogram of the ratio across the threshold spectrum to actively search for the threshold value that produces a closest match to the target ratio value.

Another aspect of the present invention is that processor applies dynamic image thresholding by setting any pixel with a value greater than the threshold to black and any pixel with a lesser value to white.

In another embodiment of the present invention, a method for use in aligning a tape cartridge accessor with cartridges in cells of a tape cartridge magazine is provided. The method including illuminating an object with an illumination source, gathering image data for the illuminated object and processing the image data by applying dynamic image thresholding to the image to select an optimum gray scale level of the image expected to include the desired physical feature.

Another aspect of the method of the present invention is that the dynamic image thresholding further comprises identifying a region of interest around the area where the intersection is expected to be, thresholding the portion of the image within the region of interest with an experimental value, calculating the ratio of black pixels to the total number of pixels, using a search method that is based upon a histogram of the ratio across the threshold spectrum to actively search for a threshold value that produces a closest match to the target ratio value and thresholding the entire image with the threshold value producing the closest match to the target value.

Another aspect of the method of the present invention is that the thresholding the portion of the image within the region of interest with an experimental value sets any pixel with a value greater than the threshold to black and any pixel with a lesser value to white.

In another embodiment of the present invention, an article of manufacture comprising a program storage medium readable by a computer is disclosed. The medium tangibly embodies one or more programs of instructions executable by the computer to perform a method for use in aligning a tape cartridge accessor with cartridges in cells of a tape cartridge magazine, the method including illuminating an object with an illumination source, gathering image data for the illuminated object and processing the image data by applying dynamic image thresholding to the image to select an optimum gray scale level of the image expected to include the desired physical feature.

Another aspect of the article of manufacture of the present invention is that the dynamic image thresholding further includes identifying a region of interest around the area where the intersection is expected to be, thresholding the portion of the image within the region of interest with an experimental value, calculating the ratio of black pixels to the total number of pixels, using a search method that is based upon a histogram of the ratio across the threshold spectrum to actively search for a threshold value that produces a closest match to the target ratio value and thresholding the entire image with the threshold value producing the closest match to the target value.

Another aspect of the article of manufacture of the present invention is that the thresholding the portion of the image within the region of interest with an experimental value sets any pixel with a value greater than the threshold to black and any pixel with a lesser value to white.

Another aspect of the article of manufacture of the present invention is that the applying dynamic image thresholding includes setting any pixel with a value greater than the threshold to black and any pixel with a lesser value to white.

In another embodiment of the present invention, an imaging picker system for use in aligning a tape cartridge accessor with cartridges in cells of a tape cartridge magazine is provided. The imaging picker system includes a picker assembly, illuminating means disposed at the picker assembly for illuminating an object and imaging means disposed on the picker assembly for gathering image data for the illuminated object, processing means, coupled to the imaging means and the illuminating means, for processing the image data obtained from the imaging means and for controlling the illuminating means, wherein the processing means applies dynamic image thresholding to the image to select an optimum gray scale level of the image, the image expected to include a desired physical feature.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

Figure 1:
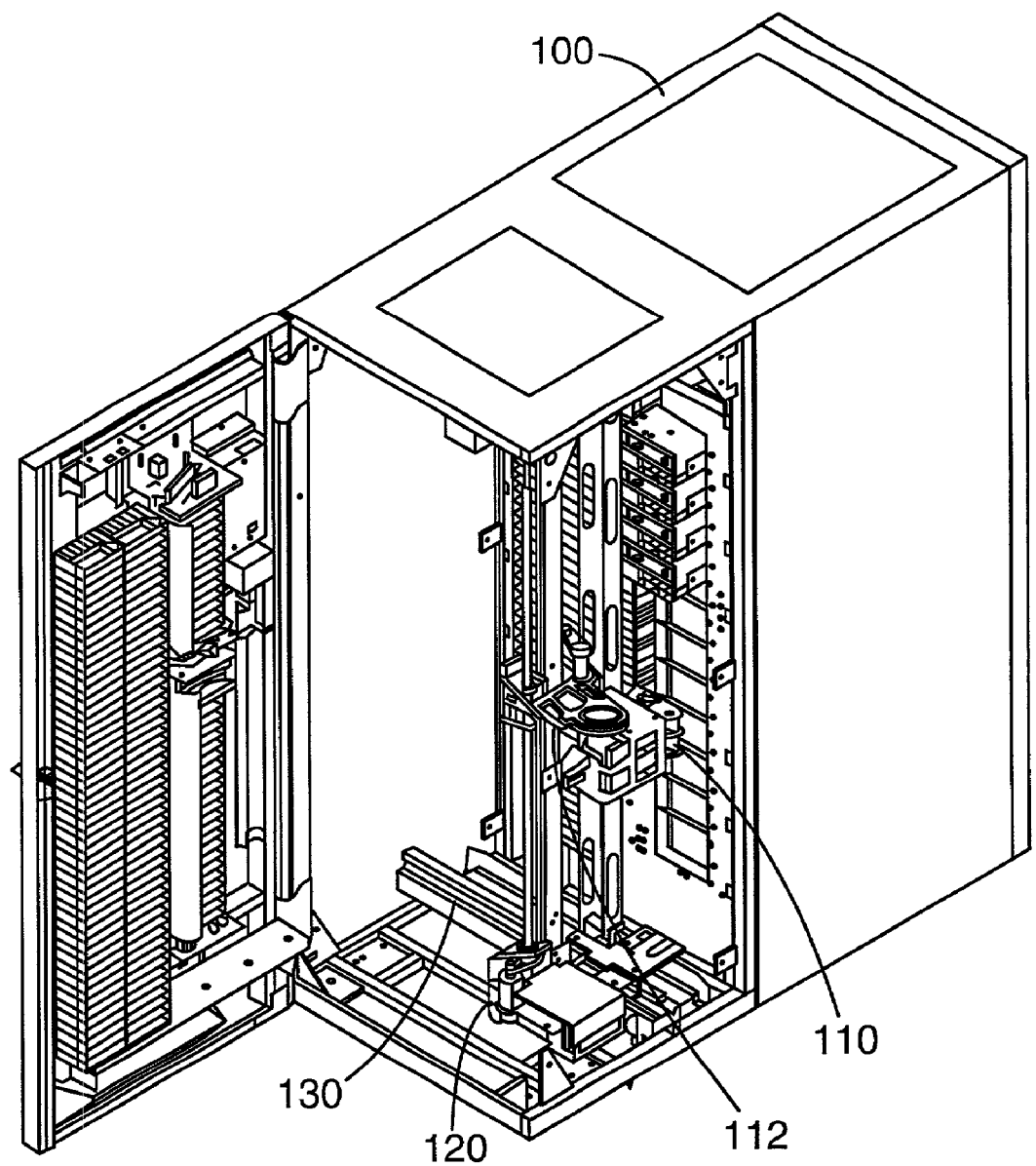
FIG. 1 illustrates an automatic tape library in accordance with the present invention.

The present invention uses a dynamic thresholding method to actively search for the threshold value that produces the desired B/T ratio (i.e., ratio of black pixels to the total number of pixels is calculated) to delineate the relevant image attributes. FIG. 1 illustrates an automatic tape library system 100 in accordance with the present invention. As shown in FIG. 1, the tape library includes a dual gripper assembly 110 coupled to a gripper/picot assembly 112. The gripper assembly 110 moves in the y-axis along the y-axis assembly 120 and in the x-axis along the x-axis assembly 130.

Figure 2:
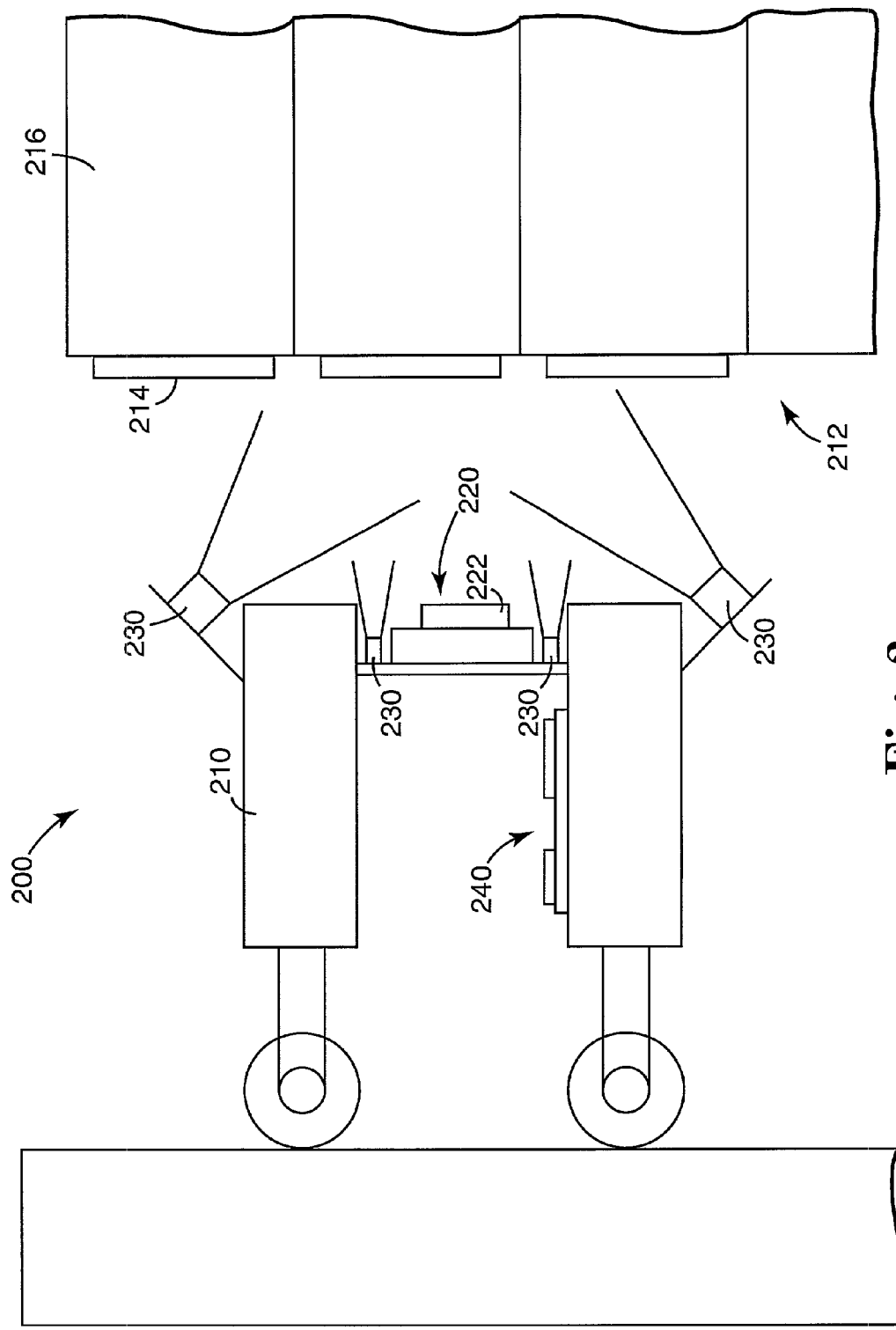
FIG. 2 illustrates an image based bar-code reading and robotic registration apparatus for use in automated tape library systems according to the present invention.

FIG. 2 illustrates an image based bar-code reading and robotic registration apparatus 200 for use in automated tape library systems according to the present invention. In FIG. 2, a picker assembly 210 is disposed along the outside of a cartridge magazine or cartridge storage cells 212. The cartridge magazine 212 includes cartridges 214 in the cartridge cells 216. The picker 210 includes an imager 220 (such as a camera, e.g., CCD camera, CMOS camera, etc.) positioned on the front of the picker assembly 210. The imager 220 includes appropriate optics 222 selected to filter out ambient light. Illumination 230 sources are disposed on the front of the picker 210. The imager 220 connects to a microprocessor or microcontroller 240 in its immediate vicinity. All image acquisition and processing are done by the imager 220 and microcontroller 240. To ensure operation independent of illumination variations, the image processing automatically adapts to dynamic lighting situations. Output data format is dependent upon the host system, for example, a serial or Controller Area Network (CAN) bus. The imager 220 provides an inexpensive self-contained image processing system to visually verify the alignment of the picker 210 with the cartridges 214. Registration can be checked with every pick, greatly increasing reliability.

Figure 3:
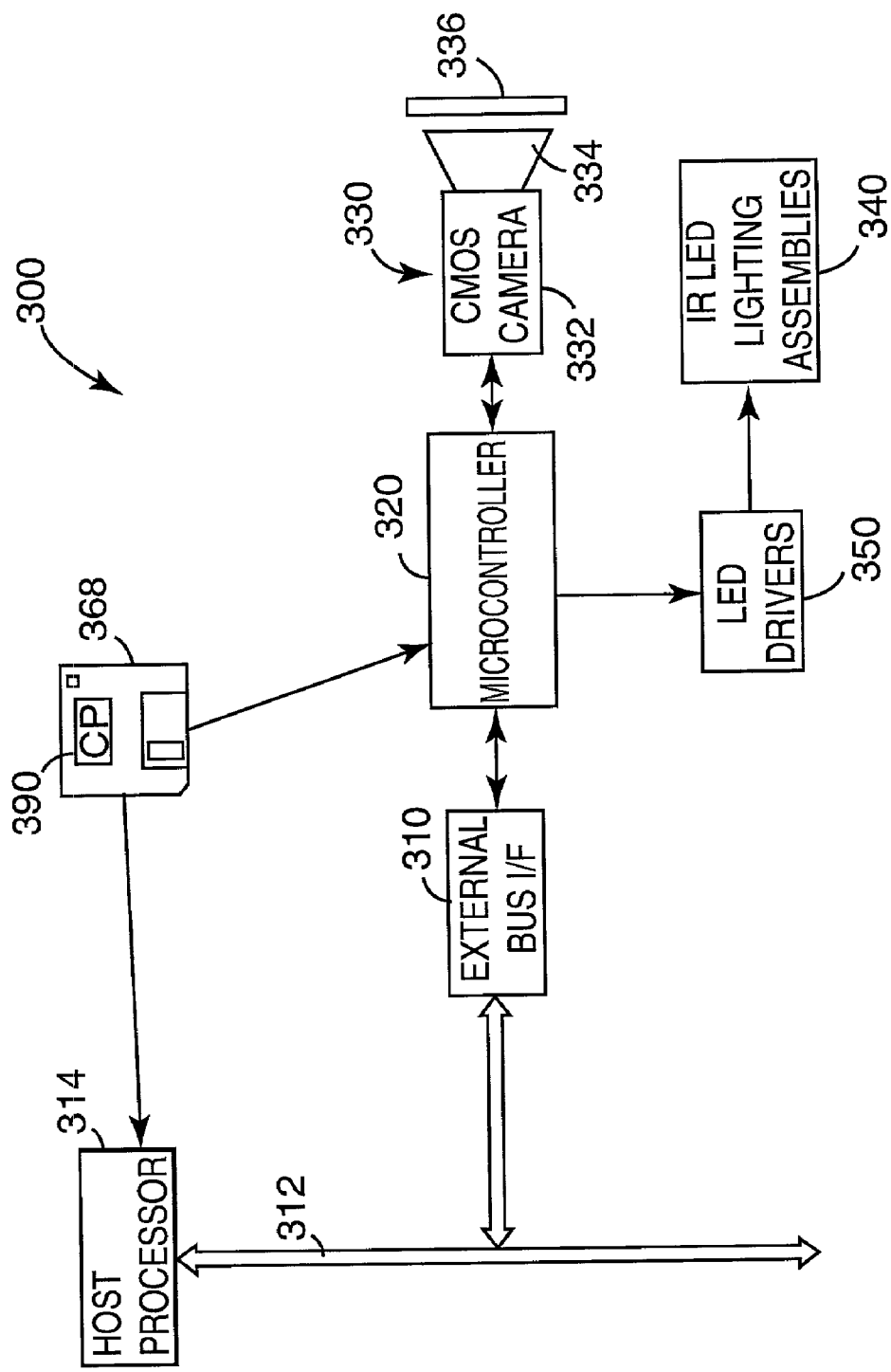
FIG. 3 illustrates a block diagram of the an image based bar-code reading and robotic registration apparatus for use in automated tape library systems according to the present invention.

FIG. 3 illustrates a block diagram 300 of an image based bar-code reading and robotic registration apparatus for use in automated tape library systems according to the present invention. An external bus interface 310 is coupled to an external communications bus 312. The external bus interface 310 is connected to a microcontroller 320. The microcontroller 320 controls both the imager 330 and the lighting assemblies 340. The microcontroller 320 provides the control signals to the imager 332. An IR filter 336 may be provided at the lens of the imager 332.

The microcontroller 320 also drives LED drivers 350. The LED drivers 350 provide signals to the IR LED lighting assemblies 340. As discussed above, during operation, the lighting 340 mounted to the picker provides specular reflection off of the cartridge cells during calibration operations to allow cartridge registration.

The system 300 may also double as a bar-code reader thereby eliminating the need for a costly laser-based scanner. The image processing system 300 will operate with two possible modes of operation. It can be either a bar-code reader or a registration sensor. The state of the system 300 determines the type of output it provides. As a bar-code reader, the system 300 outputs the values of bar-codes to the external bus interface 310. As a registration sensor, the system 300 outputs an offset value of some detected image feature from its nominal location in the x, y plane to the external bus interface 310.

The system 300 uses imaging techniques by combining imagers 330 and inexpensive, yet powerful, microcontrollers 320. The entire system 300 is mounted on the picker assembly and is therefore completely self-contained. Calibration could be verified on every single pick operation, and a need for a separate bar-code scanner is eliminated, thereby reducing system cost. The present invention also increases product reliability because it continuously visually verifies the position of the picker, eliminating the need for time consuming recalibration. During operation, the lighting 340 mounted to the picker provides specular reflection off of the cartridge cells during calibration operations. More diffuse lighting may be selected for bar-code reading.

The image processing method according to the present invention uses a binary image in which the feature in question, i.e., the corner of a data-cartridge storage cell, is clearly delineated. Relevant image data is enhanced, while irrelevant data is suppressed. Static thresholding does not guarantee that the region of interest will be augmented such that the processing method will be able to identify the region of interest. Because the system is required to operate in dynamic lighting conditions, a single preset threshold value will not be valid for a large number of test cases. The unique method of dynamic thresholding according to the present invention attempts to find optimal threshold values for a static thresholding method to use, regardless of lighting conditions.

The task of finding the threshold value is made easier by the fact that the region of interest can be isolated within a rectangular region, and that very little background noise is present in this region. When the region of interest has been properly thresholded, its important physical attributes are present, and little or no noise from other objects exists.

Figure 4:
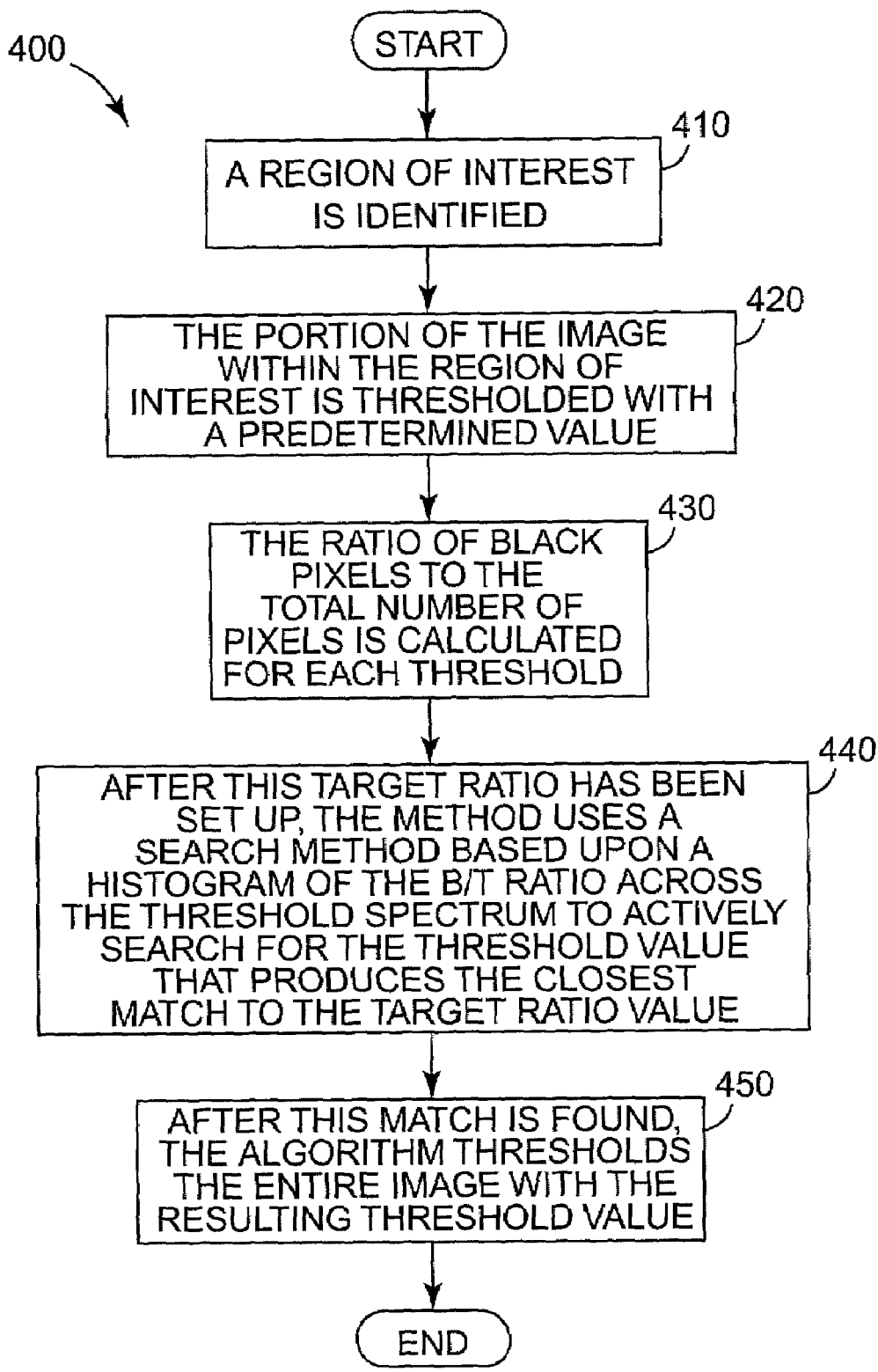
FIG. 4 is a flow chart of the for dynamic thresholding of grayscale images to delineate image attributes.

FIG. 4 is a flow chart of the dynamic thresholding of grayscale images to delineate image attributes according to the present invention. A region of interest is identified 410, for example by drawing an "attention window" around the area where the intersection is expected to be. The method thresholds the portion of the image within the region of interest with a predetermined value 420, which may be obtained through previous experimentation. Any pixel with a value greater than the threshold is set to black, and any with a lesser value is cleared to white. After the experimental threshold is taken, the ratio of black pixels to the total number of pixels is calculated 430 for each threshold. This ratio is called the BIT Ratio.

Figure 5:
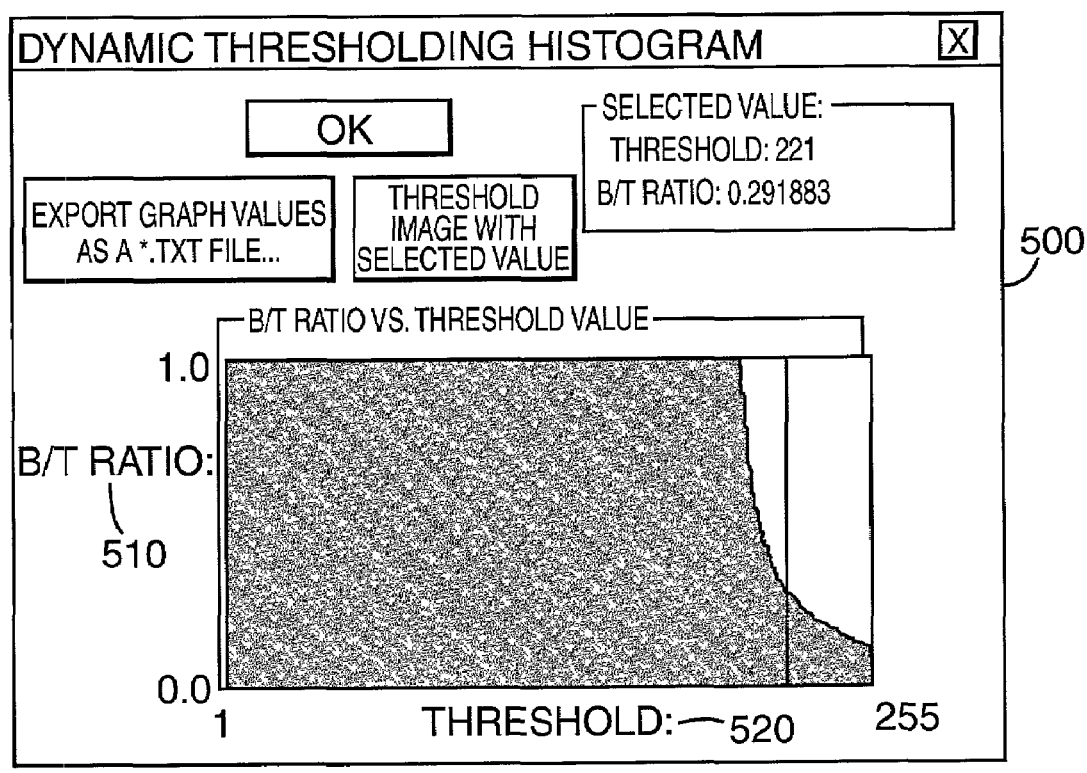
FIG. 5 is a graph showing the ratio between black pixels (binary 1) to total pixels in the window, black or white, in relation to the spectrum of possible threshold values (1–255) 520, wherein the threshold is set high.
Figure 8:
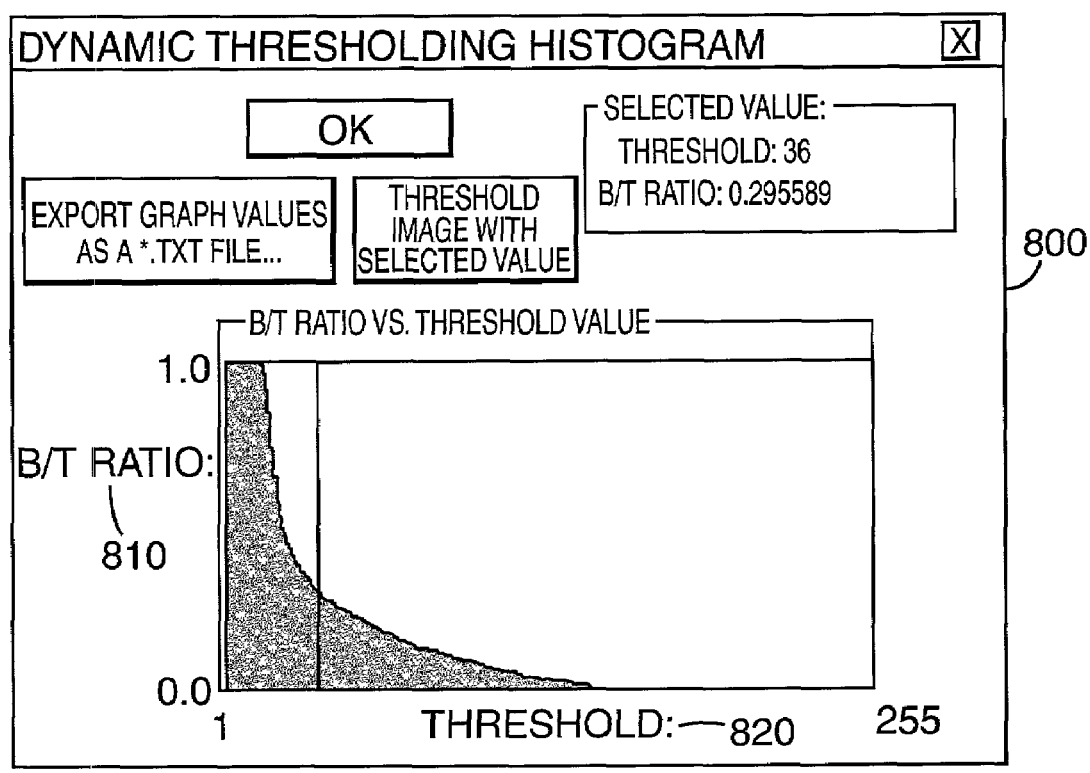
FIG. 8 is a graph showing the ratio between black pixels (binary 1) to total pixels in the window, black or white, in relation to the spectrum of possible threshold values (1–255), wherein the threshold is set low.

FIG. 5 is a graph 500 showing the ratio 510 between black pixels (binary 1) to total pixels in the window, black or white, in relation to the spectrum of possible threshold values (1–255) 520, wherein the threshold is set high. FIG. 5 illustrates the basic half-bell shape 500 that is produced in all test cases. FIGS. 5 and 8 show two extremes in lighting, demonstrating the ability of the dynamic thresholding method according to the present invention to isolate the correct image features regardless of image intensity.

An image attribute with the required properties discussed above will show a specific and repeatable BIT Ratio 510 when it is properly delineated through thresholding. A human experimenter may be used to find this target B/T Ratio 510.

Referring again to FIG. 4, after this target ratio has been set up, the method uses a search method that may be based on a histogram of the B/T Ratio across the threshold spectrum to actively search for the threshold value that produces the closest match to the target ratio value 440. After this match is found, the method thresholds the entire image with the resulting threshold value 450.

The dynamic thresholding method according to the present invention can be used for images in which the attribute being searched for has a predictable and repeatable shape. The present invention uses the region of interest identified around the target image attribute. Thus, the present invention is only useful for applications in which the general location of the target attribute can be predicted.

Figure 7:
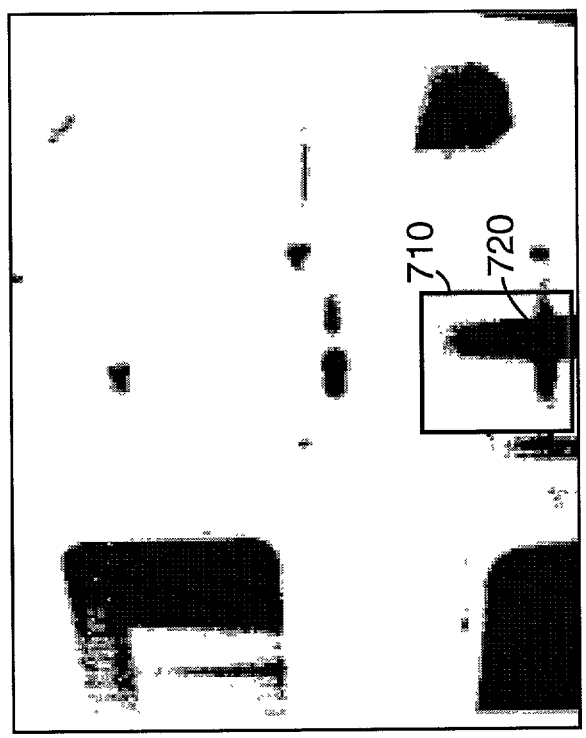
FIG. 7 illustrates the resulting binary images after dynamic thresholding for the high threshold setting illustrated in FIG. 5.
Figure 6:
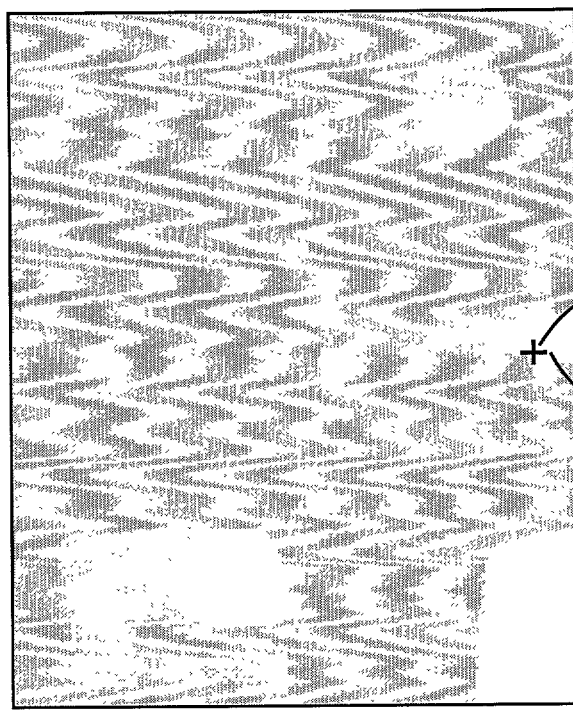
FIG. 6 illustrates the gray-scale inputs for the high threshold setting illustrated in FIG. 5.

FIG. 6 illustrates the gray-scale inputs 600, and FIG. 7 illustrates the resulting binary images 700 after dynamic thresholding for the high threshold setting illustrated in FIG. 5. The box 710 in FIG. 7 is the region of interest, and the "+" 610 in FIG. 6 is the results of the feature detection method that runs after thresholding operations. Thus, FIGS. 6–7 demonstrate that the image features in question were successfully detected.

Both FIGS. 6 and 7 show the intersection 620, 720. The actual position of the intersection 720 within the region of interest 710 is unimportant because the same area of the cell will be visible as long as the entire intersection 720 is located within the region of interest 710. Because of the attributes described above, images with the same B/T ratio, regardless of actual lighting and threshold values, will look very similar—similar enough that the image processing method will produce nearly identical results.

If the B/T ratio where the intersection is most visible is known, then it is a small matter for the active thresholding method to scan until it finds a threshold that will produce the desired B/T ratio. After this threshold is found, the image can be statically thresholded with this value and the image processing code can successfully run.

FIG. 8 is a graph 800 showing the ratio 810 between black pixels (binary 1) to total pixels in the window, black or white, in relation to the spectrum of possible threshold values (1–255) 820, wherein the threshold is set low. FIG. 8 shows the other extreme in lighting, as compared to FIG. 5, demonstrating the ability of the dynamic thresholding method according to the present invention to isolate the correct image features regardless of image intensity. Accordingly, FIGS. 6–7 and 9–10 demonstrate that the image features in question may be successfully detected, even with such a wide variance in levels of the image gray scale content.

Figure 10:
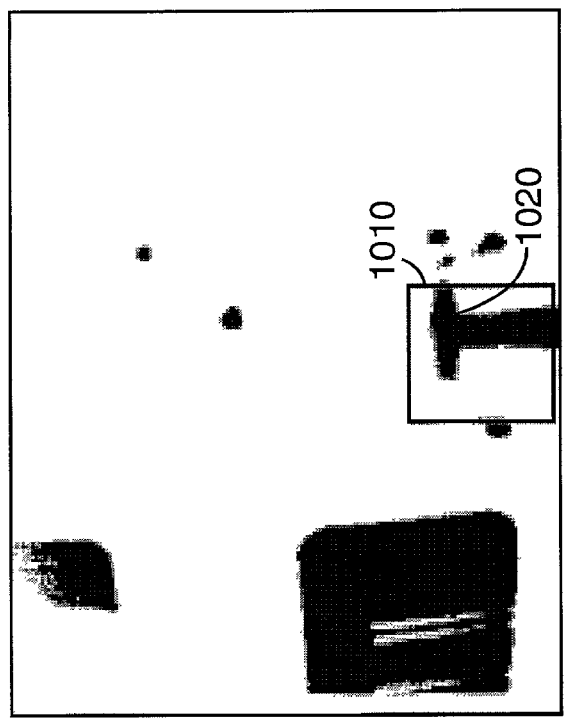
FIG. 10 illustrates the resulting binary images after dynamic thresholding for the high threshold setting illustrated in FIG. 8.
Figure 9:
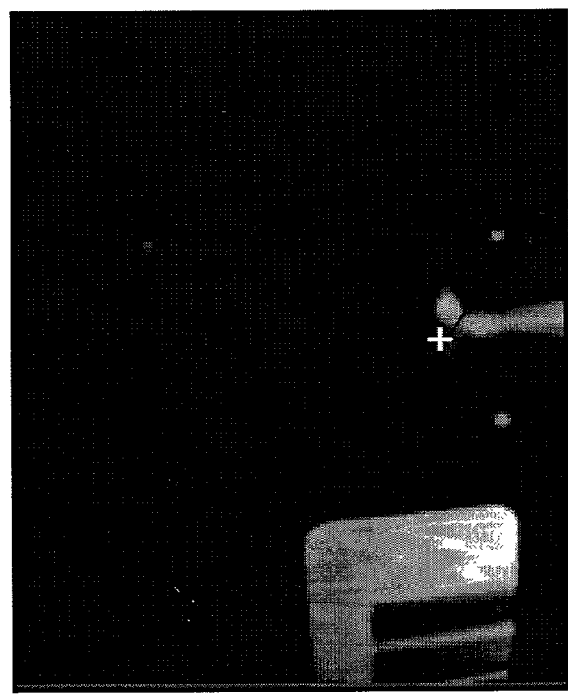
FIG. 9 illustrates the gray-scale inputs for the high threshold setting illustrated in FIG. 8.

FIG. 9 illustrates the gray-scale inputs 900, and FIG. 10 illustrates the resulting binary images 1000 after dynamic thresholding for the high threshold setting illustrated in FIG. 8. The box 1010 in FIG. 10 is the region of interest, and the "+" 910 in FIG. 9 is the results of the feature detection method that runs after thresholding operations. Thus, FIGS. 9–10 demonstrate that the image features in question were successfully detected after thresholding even when the region of interest as represented by the levels of the image gray scale content is difficult to identify. Because of the attributes described above, images with the same B/T ratio, regardless of actual lighting and threshold values, will look very similar after thresholding—similar enough that the image processing method will produce nearly identical results.

Thus, according to the present invention, a dynamic thresholding method actively searches for the threshold value that produces the desired BIT ratio to delineate the relevant image attributes.

Referring again to FIG. 3, an image based bar-code reading and robotic registration system 300 according to the present invention is shown, wherein the process illustrated with reference to FIGS. 4–10 may be tangibly embodied in a computer-readable medium or carrier, e.g. one or more of the fixed and/or removable data storage devices 368 illustrated in FIG. 3, or other data storage or data communications devices. A computer program 390 expressing the processes embodied on the removable data storage devices 368 may be loaded into the microcontroller 320 or into a processor 314 coupled to the external communications bus 312 to configure the microcontroller 320 or host processor 314 of FIG. 3, for execution. The computer program 390 comprise instructions which, when read and executed by the microcontroller 320 or host processor 314 of FIG. 3, causes the microcontroller 320 or host processor 314 to perform the steps necessary to execute the steps or elements of the present invention The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An imaging picker system for use in aligning a tape cartridge accessor with cartridges in cells of a tape cartridge magazine, comprising:
   a picker assembly;
   an imager disposed on the picker assembly;
   illumination sources disposed on the picker assembly; and
   a processor, coupled to the imager and illumination sources, for processing image data obtained from the imager and for controlling the illumination sources;
   wherein the processor applies dynamic image thresholding to the image to select an optimum gray scale level of the image, the image expected to include a desired physical feature and wherein the processor performs dynamic image thresholding by identifying a region of interest around the area where the desired physical feature is expected to be, thresholding the portion of the image within the region of interest with an experimental gray scale value, calculating the ratio of black pixels to the total number of pixels, and using a search method based on a histogram of the ratio across the threshold spectrum to actively search for the threshold value that produces a closest match to the target ratio value.

2. The imaging picker system of claim 1 wherein the thresholding the portion of the image within the region of interest with an experimental value sets any pixel with a value greater than the threshold to black and any pixel with a lesser value to white.

3. The imaging picker system of claim 1 wherein the applying dynamic image thresholding includes setting any pixel with a value greater than the threshold to black and any pixel with a lesser value to white.

4. A method for use in aligning a tape cartridge accessor with cartridges in cells of a tape library, comprising:
   illuminating an object with an illumination source;
   gathering image data for the illuminated object; and
   processing the image data by applying dynamic image thresholding to the image to select an optimum gray scale level of the image expected to include a desired physical feature;
   wherein the dynamic image thresholding further comprises identifying a region of interest around the area where the desired physical feature is expected to be, thresholding the portion of the image within the region of interest with an experimental value, calculating the ratio of black pixels to the total number of pixels, using a search method that is based upon a histogram of the ratio across the threshold spectrum to actively search for a threshold value that produces a closest match to the target ratio value and thresholding the entire image with the threshold value producing the closest match to the target value.

5. The method of claim 4, wherein the thresholding the portion of the image within the region of interest with an experimental value sets any pixel with a value greater than the threshold to black and any pixel with a lesser value to white.

6. The method of claim 4 wherein the applying dynamic image thresholding includes setting any pixel with a value greater than the threshold to black and any pixel with a lesser value to white.

7. An article of manufacture comprising a program storage medium readable by a computer, the medium tangibly embodying one or more programs of instructions executable by the computer to perform a method for use in aligning a tape cartridge accessor with cartridges in cells of a tape cartridge magazine, the method comprising:

illuminating an object with an illumination source;

gathering image data for the illuminated object; and processing the image data by applying dynamic image thresholding to the image to select an optimum gray scale level of the image expected to include a desired physical feature;

wherein the dynamic image thresholding further comprises identifying a region of interest around the area where the desired physical feature is expected to be, thresholding the portion of the image within the region of interest with an experimental value, calculating the ratio of black pixels to the total number of pixels, using a search method that is based upon a histogram of the ratio across the threshold spectrum to actively search for a threshold value that produces a closest match to the target ratio value and thresholding the entire image with the threshold value producing the closest match to the target value.

8. The article of manufacture of claim 7, wherein the thresholding the portion of the image within the region of interest with an experimental value sets any pixel with a value greater than the threshold to black and any pixel with a lesser value to white.

9. The article of manufacture of claim 7 wherein the applying dynamic image thresholding includes setting any pixel with a value greater than the threshold to black and any pixel with a lesser value to white.

10. An imaging picker system for use in aligning a tape cartridge accessor with cartridges in cells of a tape library, comprising:

a picker assembly;

illuminating means disposed on the picker assembly for illuminating an object; and imaging means disposed on the picker assembly for gathering image data for the illuminated object;

processing means, coupled to the imaging means and the illuminating means, for processing the image data obtained from the imaging means and for controlling the illuminating means;

wherein the processing means applies dynamic image thresholding to the image to select an optimum gray scale level of the image, the image expected to include a desired physical feature;

wherein the processing means performs dynamic image thresholding by identifying a region of interest around the area where the desired physical feature is expected to be, thresholding the portion of the image within the region of interest with an experimental value, calculating the ratio of black pixels to the total number of pixels, using a search method based upon a histogram of the ratio across the threshold spectrum to actively search for a threshold value that produces a closest match to the target ratio value and thresholding the entire image with the threshold value producing the closest match to the target value.

11. The imaging picker system of claim 10, wherein the processing means thresholds the portion of the image within the region of interest with an experimental value by setting any pixel with a value greater than the threshold to black and any pixel with a lesser value to white.

12. The imaging picker system of claim 10 wherein the processing means applies dynamic image thresholding by setting any pixel with a value greater than the threshold to black and any pixel with a lesser value to white.

\* \* \* \* \*